US010938764B2

(12) United States Patent
Bagby et al.

(10) Patent No.: US 10,938,764 B2
(45) Date of Patent: *Mar. 2, 2021

(54) USING ORGANIZATIONAL RANK TO FACILITATE ELECTRONIC COMMUNICATION

(71) Applicant: INTERNATIONAL BUSINESS MACHINES CORPORATION, Armonk, NY (US)

(72) Inventors: Lance M. Bagby, Austin, TX (US); Ajay Kumar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,136

(22) Filed: Nov. 16, 2018

(65) Prior Publication Data

US 2019/0089663 A1 Mar. 21, 2019

Related U.S. Application Data

(63) Continuation of application No. 14/263,313, filed on Apr. 28, 2014, now Pat. No. 10,171,400.

(51) Int. Cl.
  *H04L 12/58* (2006.01)
  *G06F 16/955* (2019.01)
  *G06Q 10/10* (2012.01)
(52) U.S. Cl.
  CPC .......... *H04L 51/18* (2013.01); *G06F 16/955* (2019.01); *G06Q 10/103* (2013.01); *H04L 51/12* (2013.01); *H04L 51/32* (2013.01)

(58) Field of Classification Search
  CPC ....... G06F 16/955; H04L 51/18; H04L 51/12; H04L 51/32; G06Q 10/103
  USPC ......................................................... 709/206
  See application file for complete search history.

(56) References Cited

U.S. PATENT DOCUMENTS

| 6,154,783 | A | 11/2000 | Gilmour et al. |
| 7,885,948 | B2 | 2/2011 | Johnson |
| 8,041,765 | B1 | 10/2011 | Krishnaswamy et al. |
| 8,046,259 | B1 | 10/2011 | Siegel et al. |
| 8,510,389 | B1 | 8/2013 | Gurajada et al. |
| 8,713,027 | B2 | 4/2014 | Forutanpour et al. |

(Continued)

OTHER PUBLICATIONS

IBM: List of IBM Patents or Patent Applications Treated as Related (Appendix P), Dec. 7, 2018, pp. 1-2.

(Continued)

*Primary Examiner* — Umar Cheema
*Assistant Examiner* — John Fan
(74) *Attorney, Agent, or Firm* — L. Jeffrey Kelly

(57) ABSTRACT

A computer program product for electronic communications. Receiving a sender identifier and a recipient identifier. A first message is received from the sender identifier to send to the recipient identifier. Determining the relative ranking of the sender and the recipient. In response to determining that the recipient has a higher relative ranking than the sender, determining whether the first message contains an action item. In response to determining that the first message contains an action item, transmitting a second message to the sender. In response to receiving an indication from the sender to send the first message, sending the first message from the sender identifier to the recipient identifier.

10 Claims, 7 Drawing Sheets

(56) References Cited

U.S. PATENT DOCUMENTS

| | | | |
|---|---|---|---|
| 8,775,523 B2 | 7/2014 | Boss et al. | |
| 8,959,109 B2 | 2/2015 | Scott et al. | |
| 2003/0237093 A1 | 12/2003 | Marsh | |
| 2005/0204001 A1 | 9/2005 | Stein et al. | |
| 2006/0026298 A1* | 2/2006 | Zeng | G06Q 10/107 709/240 |
| 2007/0280439 A1* | 12/2007 | Prywes | H04M 11/10 379/88.18 |
| 2008/0162640 A1* | 7/2008 | Boss | G06Q 10/107 709/206 |
| 2009/0037543 A1 | 2/2009 | Callanan et al. | |
| 2010/0050074 A1 | 2/2010 | Nachmani et al. | |
| 2010/0198931 A1 | 8/2010 | Pocklington et al. | |
| 2011/0138479 A1* | 6/2011 | Jain | G06F 21/64 726/28 |
| 2011/0307563 A1 | 12/2011 | Deluca | |
| 2013/0232424 A1 | 9/2013 | Nakagoe et al. | |
| 2014/0244765 A1* | 8/2014 | Smith | H04L 51/24 709/206 |
| 2015/0242817 A1 | 8/2015 | Srimushnam | |
| 2015/0312192 A1 | 10/2015 | Bagby et al. | |
| 2017/0083533 A1 | 3/2017 | Chakra et al. | |

OTHER PUBLICATIONS

Bagby et al., Pending U.S. Appl. No. 16/193,173, titled "Using Organizational Rank to Facilitate Electronic Communication", pp. 1-22.

Kwak et al., "What is Twitter, a Social Network or a News Media?", Department of Computer Science, KAIST, WWW 2010, Apr. 26-30, 2010, Raleigh, North Carolina, USA. ACM 978-1-60558-799-8/10/04.

* cited by examiner

US 10,938,764 B2

USING ORGANIZATIONAL RANK TO FACILITATE ELECTRONIC COMMUNICATION

FIELD OF THE INVENTION

The present invention relates to transferring data between computers on demand, such as instant messaging, and more particularly, to allowing confirmation of the transfer upon certain conditions in the data.

BACKGROUND OF THE INVENTION

Online chat applications are a popular medium of communication. These tools help users stay connected to each other and may promote productivity. Instant Messaging, in particular, has grown beyond its original niche of personal communications tool to a collaboration tool within business environments.

SUMMARY

Embodiments of the present invention disclose a method, computer program product, and system for electronic communications. A computer receives a sender identifier and a recipient identifier. A first message is received from the sender identifier to send to the recipient identifier. A computer determines the relative ranking of the sender and the recipient. In response to determining that the recipient has a higher relative ranking than the sender, the computer determines whether the first message contains an action item. In response to determining that the first message contains an action item, the computer transmits a second message to the sender. In response to receiving an indication from the sender to send the first message, the computer sends the first message from the sender identifier to the recipient identifier.

DETAILED DESCRIPTION

Figure 1:
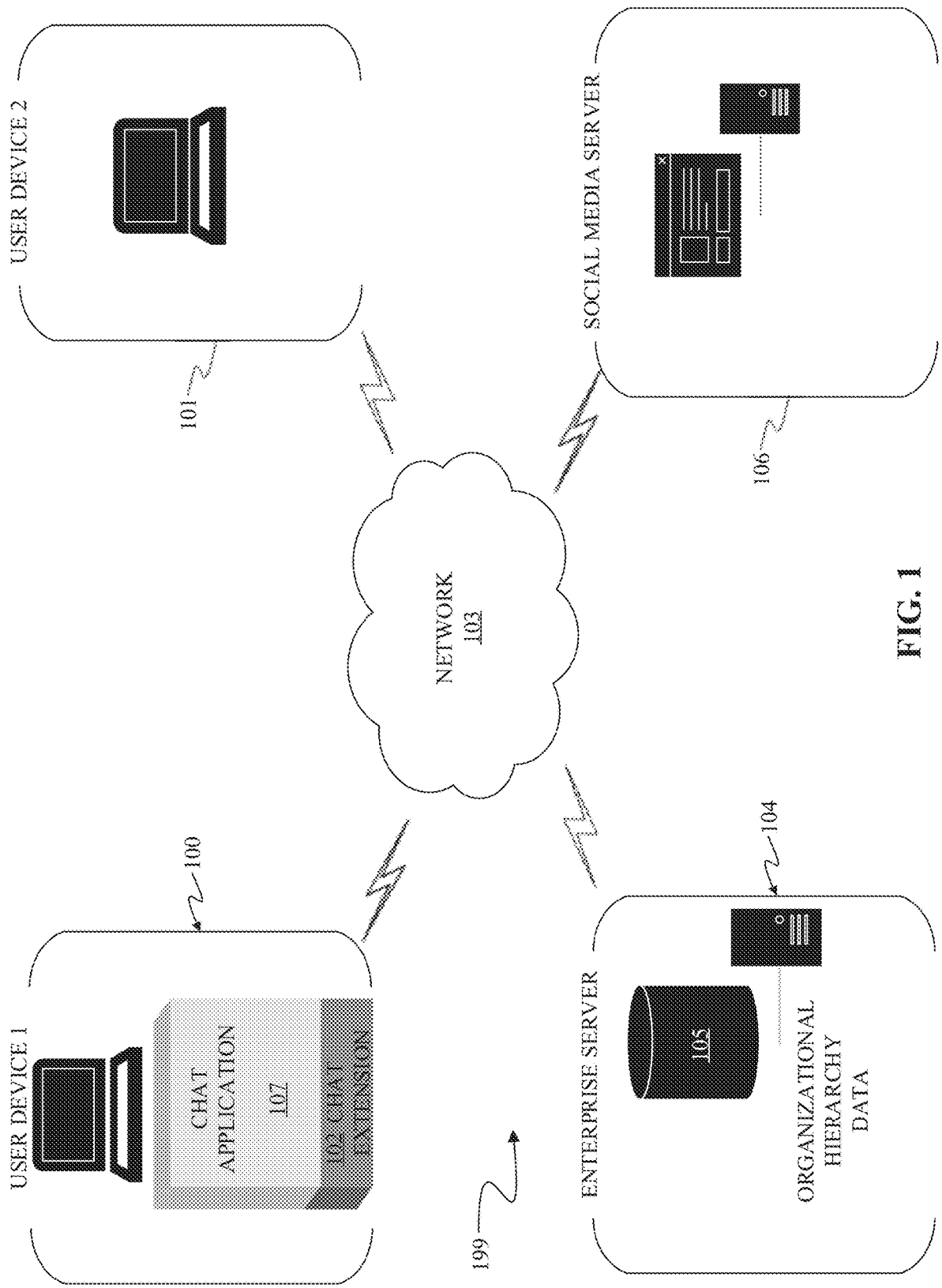
FIG. 1 is a schematic block diagram of a social media environment, in accordance with an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In a setting where a chain of command is established, a quick flow of information through the ranks may be required. Social media applications and websites, such as instant messaging (IM), Facebook.com, Twitter.com or WhatsApp utilize a quick flow of information between friends or colleagues.

Use of such applications has grown tremendously in both scope and benefit. Social media applications and email may be advantageous to business communications by offering nearly instant exchange of information. For example, in a business setting, a company may utilize social media and email as an alternative to more formal communications, such as memoranda or meetings. During the course of a day, IM users initiate and respond to numerous chat requests from individuals of different hierarchical ranking within their company. A user may receive a chat request from a subordinate and a supervisor within a very short time period. Due to this quick pace of interaction, a user may not distinguish between the two displayed chat windows and inadvertently send a message intended for a peer or subordinate to a supervisor.

Another problem that may be faced by users interacting with members of different hierarchical rank is sending messages that may contain spelling or grammar errors. Users may rely on spell checking software to correct their errors prior to sending chat communications to their supervisor. Unfortunately, spelling and grammar errors may be missed and unintentionally sent, due to the limitations of spell checking software. For example, a distinction between "it's" and "its" can be often omitted by spell checking software because both are correctly spelled but have different uses. Such missed errors may be sent to individuals of a higher hierarchical ranking than the sender, causing embarrassment and the appearance of un-professionalism. It may be advantageous for social media, chat and email applications to identify such errors and allow for correction prior to sending a message to an individual of higher hierarchical rank.

In an embodiment, a chat application may determine a user's relative hierarchical ranking within a company. The chat application may analyze the content of a message entered by a user having a lower relative hierarchical ranking for specific action items. Such action items may be, for example, specific words, phrases or even numerical values. If found, the chat application may prompt the user to review the message prior to sending it. Allowing the user to review the message prior to sending may increase the chance of catching missed errors or information from being sent to a higher ranked user.

FIG. 1 is a schematic block diagram of social media environment 199, in accordance with embodiment of the invention. Social media environment 199 includes user device 1 100, user device 2 101, enterprise server 104, and social media server 106, all interconnected over network 103. Enterprise server 104 may include organizational hierarchical data 105 which can be accessed by user device 1 100 through network 103. User device 1 100 may connect to user device 2 101 via social media server 106 over network 103.

Network 103 can be, for example, a local area network (LAN), a wide area network (WAN) such as the Internet, or a combination of the two, and can include wired or wireless connections. In general, network 103 can be any combination of connections and protocols that will support communications via various channels between user device 1 100, user device 2 101, enterprise server 104, and social media server 106, in accordance with an embodiment of the invention. Network 103 may form any type of communication fabric, such as communication fabric 518 (FIG. 5), through which data is sent and received. One example of network 103 may be company's intranet or the Internet.

Although the embodiments of the invention described herein are directed to a chat application, it will be appreciated by those of skill in the art that embodiments are not limited to chat, but instead can be practiced with all forms of electronic communication including, but not limited to, email, micro blogging, and social media.

Social media server 106 may be a web server that hosts social networking, microblogging services, chat applications, or other forms of electronic communications; enabling user devices 1 100 and user device 2 101 to send and receive electronic communications via a hosted electronic communication application. While FIG. 1 illustrates a single social media server 106, it is noted for clarity that multiple servers may be used to implement the electronic communication. Social media server 106 may be a laptop computer, tablet computer, netbook computer, personal computer (PC), a desktop computer, a personal digital assistant (PDA), a smart phone, or any programmable electronic device in accordance with an embodiment of the invention.

Enterprise server 104 may be a web server configured to store data, and send and receive electronic communications with other devices within social media environment 199. While FIG. 1 illustrates a single enterprise server 104, it is noted for clarity that multiple servers may be used to implement the electronic communication and storage of data. Enterprise server 106 may also be a laptop computer, tablet computer, netbook computer, personal computer (PC), a desktop computer, a personal digital assistant (PDA), a smart phone, or any programmable electronic device capable of communicating with other devices, storing and transmitting data, in accordance with an embodiment of the invention.

In one embodiment of the invention, enterprise server 104 includes organizational hierarchy data 105. Alternative embodiments of the present invention may store the organizational hierarchy data 105 on other devices shown in social media environment 199, including but not limited to user device 1 100. As an example, chat extension 102 may access organizational hierarchy data 105 by accessing storage device located on user device 1 100.

Organizational hierarchy data 105 may contain organizational data files or organizational titles of a business entity, or institution of members to be ranked. Such data files may hold information which may be used to determine the relative ranking of users within a group. For example, the information may include the reporting relationships of all company employees. The relative ranking of users may be determined, for example, based on the users' direct reporting relationship in the same reporting chain, i.e., one user reports to the other, or the number of management levels to a common manager. For example, if the two users do not report to the same manager, but their managers ultimately report to the same vice president, relative ranking may be determined by comparing the number of reporting levels for each user up to the vice president. If one user has fewer reporting levels up to the vice president than the other user, the first user will have higher organizational hierarchical ranking.

Enterprise server 104 may determine relative ranking upon receiving users' identifiers and running an application to access organizational hierarchy data 105. After relative ranking is determined it transmits the information to the requestor.

In one embodiment, user device 1 100 includes chat application 107, which may include chat extension 102. Chat application 107 may be a set of communications technologies used for text-based communication between two or more users. One example of such communication may be an instant messaging application in which users receive and transmit messages via the Internet, company intranet or other network. Instant messaging communication may be transmitted in near real-time between users, where chat messages can resemble an ongoing "conversation". In an exemplary embodiment, chat application 107 transmits messages via network 103 to social media server 106. Social media server 106 resolves the network name and location of the recipient of the message, which is then transmitted to user device 2 101. In various embodiments, user device 1 100 may include, but is not limited to, email applications, social media applications, web based communication technology or mobile instant messaging.

At initiation of chat communication, chat extension 102 intercepts the message before chat application 107 transmits it to receiving user on a receiving device, such as user device 1 101. Chat extension 102 transmits sending and receiving users' identifiers to enterprise server 104. Chat extension 102 then receives users' ranking from enterprise server 104. If the relative ranking of the sending user is higher than or equal to the ranking of the receiving user, chat extension 102 allows the chat session to be established by chat application 107. If the relative ranking of the sending user is lower than the ranking of the receiving user, chat extension 102 analyzes the chat message for action items. If action items are found, chat extension 102 presents an editable version of the message and allows the sending user to revise the chat message prior to sending.

A sending user may start a chat communication on user device 1 100 with a receiving user on user device 2 101 by initiating a chat message. For example, such message can be initiated by pressing a "Send" button or selecting a receiving user from a user list.

In alternative embodiments, chat extension 102 may display a notification to the sending user after determining the receiving user is of higher ranking. Such message may be displayed prior to analyzing a message for predetermined action items, in order to notify sending user of the difference in ranking before initiation of a message.

If action items are found within message, chat extension 102 may allow the sending user to review the corresponding message. An example of an action items may be predefined numeric values, specific words or phrases such as; "its", "it's" or "I can't". These action items may be set by an individual user of a group or by a business entity. Such predefined action items may be used to enforce or monitor a company's policy or prevent mistakes from being assimilated within the company. For example, a business organization may want to prevent employees from sharing sales figures with management prior to confirmation or review. This policy can be facilitated by setting all numeric values in a message as action items. Lower ranking employees may still send messages containing numeric value entries, such as phone numbers or addresses after reviewing the message but are reminded of the business policy. In one embodiment, chat extension 102 may notify a third party such as a sender's direct manager of a message containing numerical values or other action items.

Chat application 107 transmits the analyzed chat message via network 103 to the receiving user on, for example, user device 2 101.

Figures 2A, 2B:
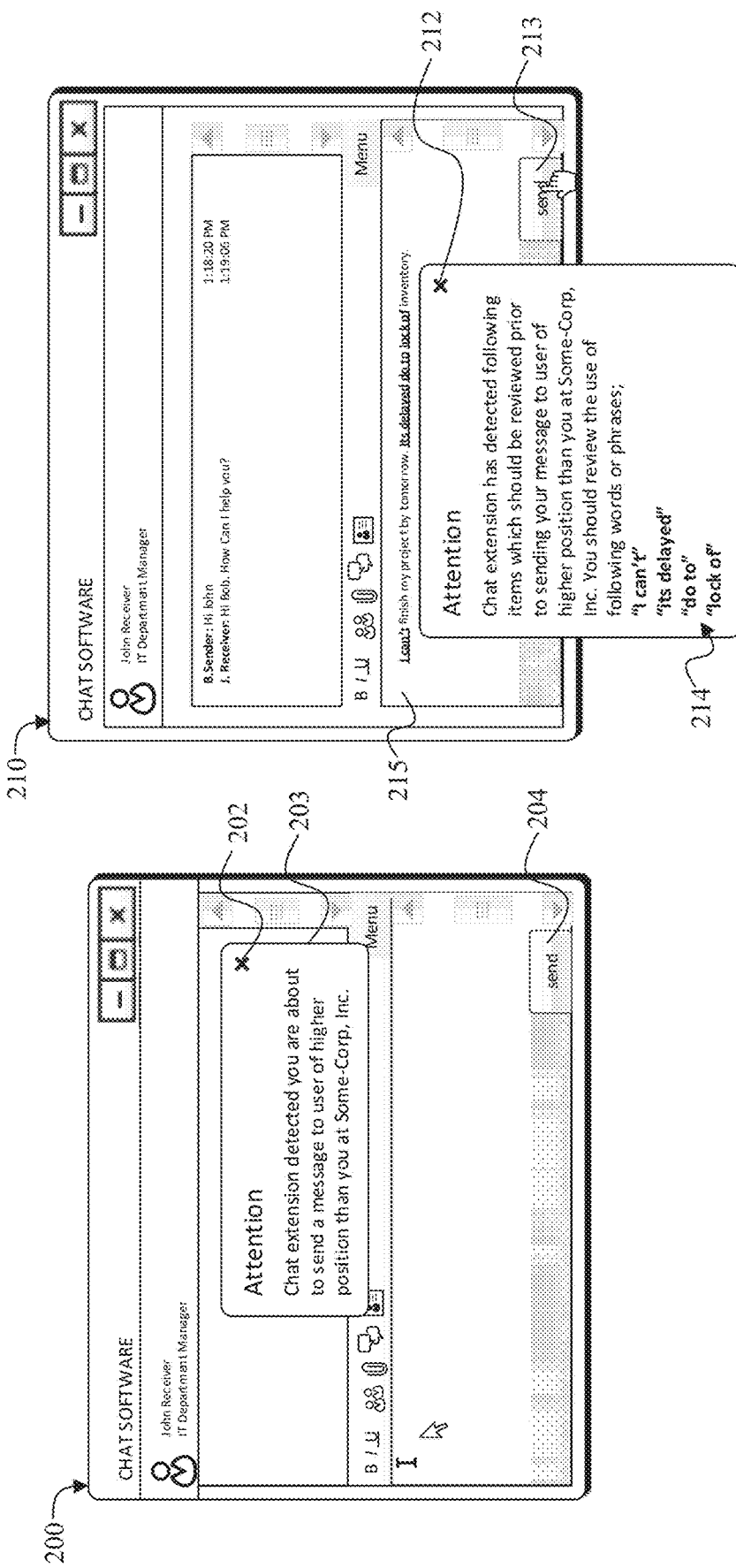
FIGS. 2A and 2B depict a graphical user interface of a chat application, in accordance with an embodiment of the present invention.

FIGS. 2A and 2B depict a graphical user interface of a chat application indicating existence of action items in a message to a user of higher ranking, in accordance with an embodiment of the present invention. In some embodiments, chat extension 102 may display action item message 214 within chat window 210. If action items are present in the chat message 215, pressing the "Send" button 213 may display action item message 214. Chat extension 102 allows the user to make a revision of the chat massage prior to sending it. Chat extension 102 may also display descriptive information corresponding to the found action items. Action item message 214 may be dismissed without altering any action items in the chat message 215 by pressing the "X" button 212 in the "Attention" message of chat window 210.

Chat message 215 may be revised to exclude the action items or sent by pressing "Send" button 213.

In alternative embodiments, chat extension 102 may display a receiving user's higher ranking message 203 within chat window 200. Pressing "Send" button 204, displays higher ranking message 203. Higher ranking message 203 displays information of higher ranking and may be dismissed by pressing the "X" button 202 in "Attention" message of chat window 200.

Figure 3A:
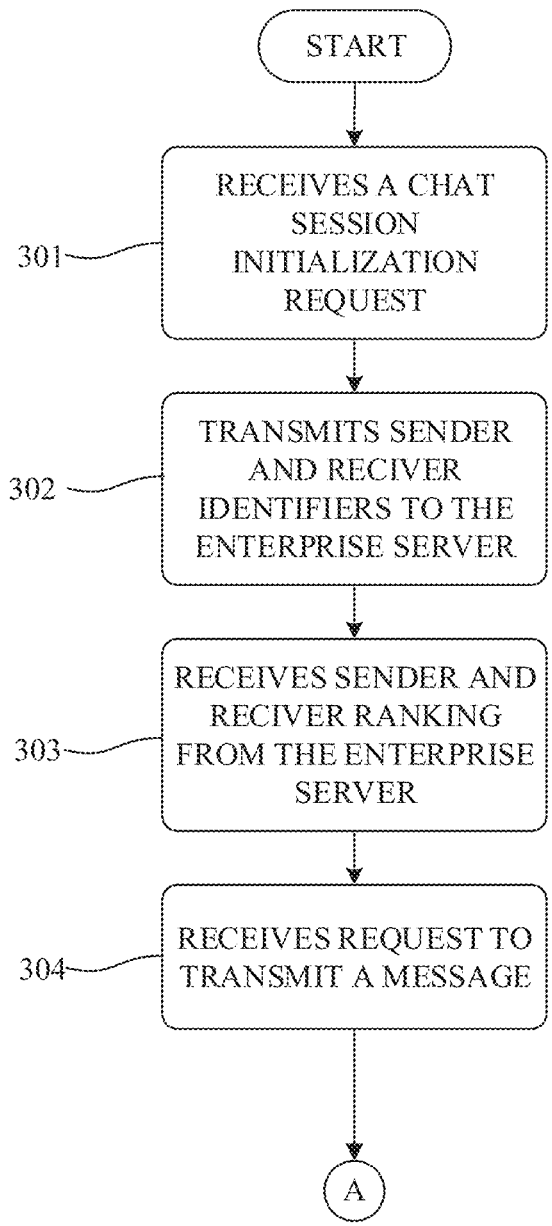
FIGS. 3A and 3B are a flowchart depicting operational steps of chat application, on a user device within the social media environment of FIG. 1, in accordance with an embodiment of the present invention.
Figure 3B:
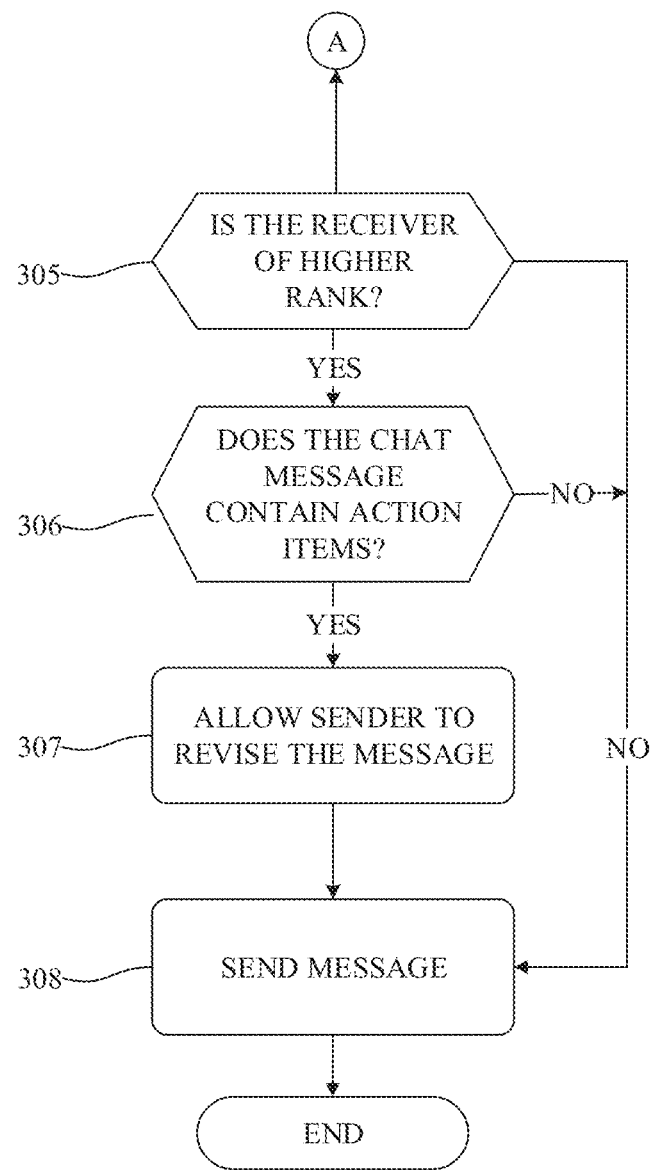

FIGS. 3A and 3B are a flowchart depicting operational steps of chat application, on a user device within the social media environment of FIG. 1, in accordance with an embodiment of the present invention. This exemplary embodiment depicts sending a message from a sending user to a receiving user located on another user device.

Chat application 107 on user device 1 100 receives a chat message initialization request from a sending user (step 301). This may occur when the "Send" button 204 is pressed or a receiving user is selected from a user list. Chat extension 102, transmits a request containing the sending and receiving users' identifiers, such as "user id", to the enterprise server 104 (step 302). Chat extension 102 receives the sending and receiving users' ranking from the enterprise server 104 (step 303). In alternative embodiments of the invention, organizational hierarchy data 105 may be accessed from a number of devices, including but not limited to a user device 1 100.

Chat application 107 receives a sending user's request to transmit a message to a receiving user (step 304). Such request may be initiated by clicking a "Send" button 204, pressing a key on smart telephone device which transmits a signal to send a message, or a receiving user is selected from a user list.

Chat extension 102 intercepts the chat message before chat application 107 sends it, and determines whether the receiving user is of higher ranking than the sending user based on the relative ranking information received from the enterprise server 104 (decision step 305).

If chat extension 102 determines that the receiving user is of higher ranking (decision step 305, "Yes" branch), chat extension 102 analyzes the message for action items (decision step 306).

If chat extension 102 determines that the message contains action items (decision 306, "Yes" branch), it allows the sending user to revise the chat message (step 307). For example, it may display a message showing all found action items, or underlines the action items in the body of the message. In one embodiment, chat extension 102 may notify a third party such as a sender's direct manager about a message containing numerical values or other action items.

If chat extension 102 determines that the message contains no action items (decision 306, "No" branch), the message is sent to a user device 2 101 via, for example, network 103 (step 308).

In response to finding the receiver of lower or equal ranking (decision 305, "No" branch), message is sent from a user device 100 via network 103 to social media server 106 (step 308). Social media server 106 may then send the message through the network 103 to a receiving user on a user device 2 101.

Figure 4A:
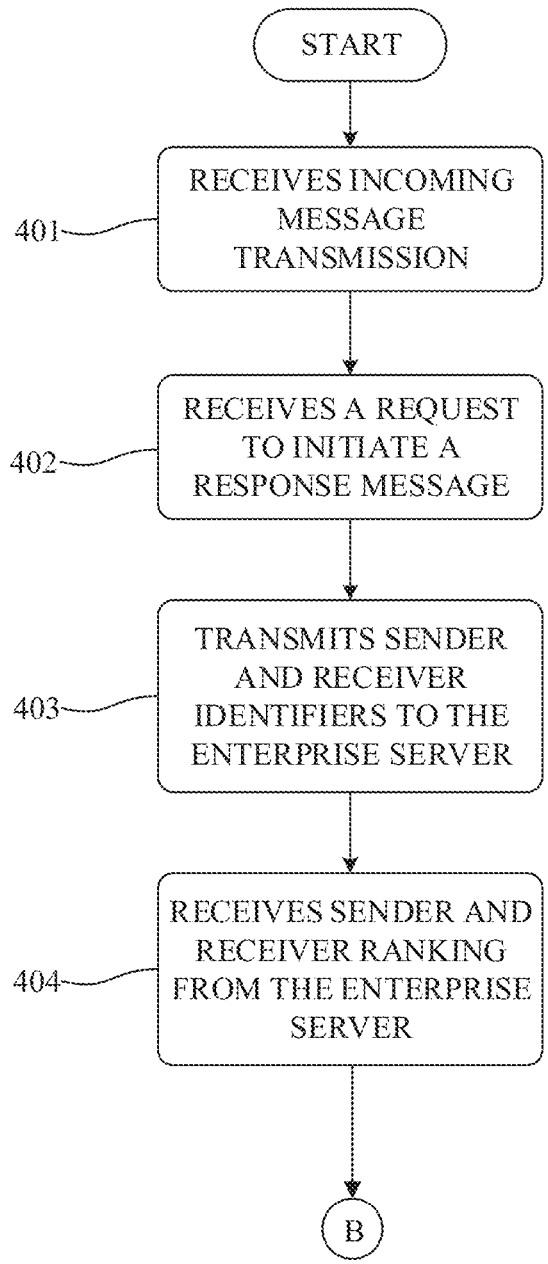
FIGS. 4A and 4B are a flowchart depicting operational steps of a chat application, on user device within the social media environment of FIG. 1, in accordance with an embodiment of the present invention.
Figure 4B:
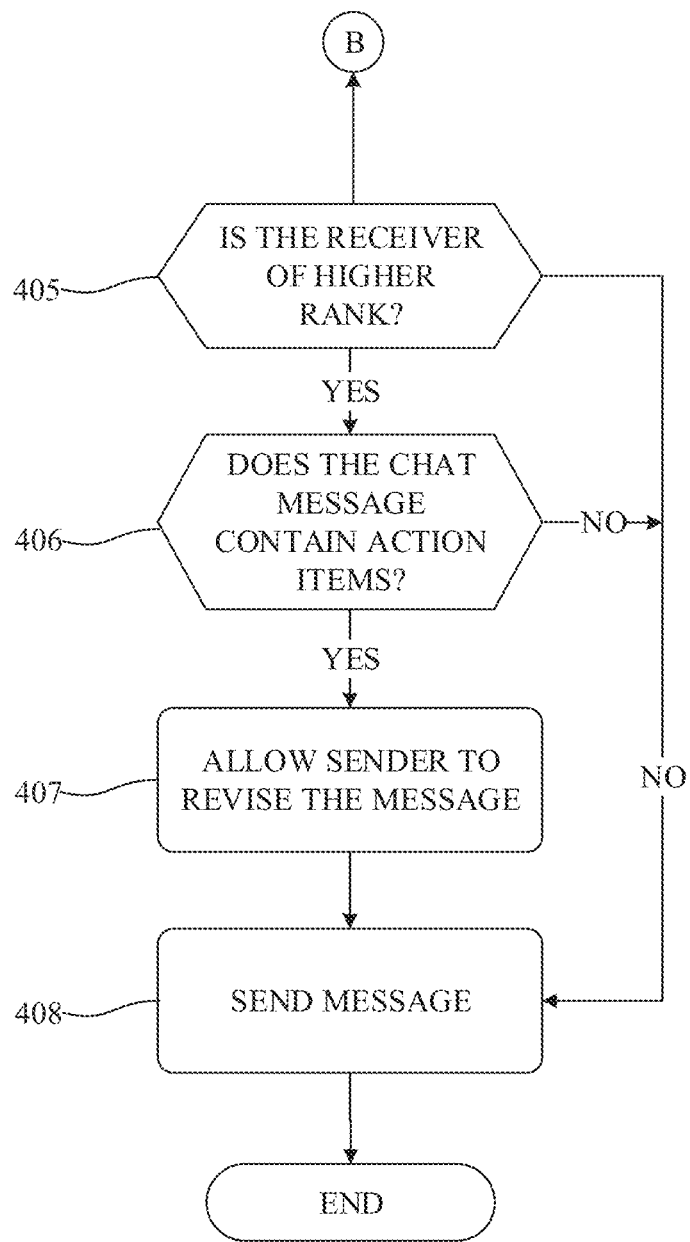

FIGS. 4A and 4B are a flowchart depicting operational steps of chat application, on a user device within the social media environment of FIG. 1, in accordance with an embodiment of the present invention. This exemplary embodiment depicts receiving a message from a sending user located on another user device.

Chat application 107 on user device 1 100 receives an incoming chat session request from a sending user (step 401). This may occur when a message is sent to a receiving user. For example, a sending user may initiate a chat application by selecting the receiving users name from a user list contained on chat application 107, writing a message and clicking the "Send" button 213.

Chat application 107 receives a request to initiate a response message (step 402). Such request may be initiated by typing text in message text box 215 and clicking the "Send" button 213, pressing a key on a smart telephone device which transmits a signal to send a message or selecting a receiving user from a user list.

Chat extension 102 intercepts the chat message before chat application 107 sends it, and transmits a request containing a sending and a receiving users' identifiers to the enterprise server 104 (step 403). Chat extension 102 receives a sending and a receiving users' ranking from the enterprise server 104 (step 404) and determines a sending and a receiving users' ranking based on the relative ranking information received from the enterprise server 104 (decision step 405).

In alternative embodiments of the invention, organizational hierarchy data 105 may be accessed from a number of devices, including but not limited to user device 1 100.

If chat extension 102 determines that the receiving user is of higher ranking (decision step 405, "Yes" branch), chat extension 102 analyzes the message for action items (decision step 406).

If chat extension 102 determines that the message contains action items (decision 406, "Yes" branch), it allows the sending user to revise the chat message (step 407). For example, it may display a message showing all action items, or underline the action items in the body of the message. In one embodiment, chat extension 102 may notify a third party such as a sender's direct manager of a message containing numerical values or other action items.

If chat extension 102 determines that the message contains no action items (decision 406, "No" branch), the message is sent to user device 2 101 via, for example, network 103 (step 408).

In response to finding the receiver of lower or equal ranking (decision 405, "No" branch), a message is sent from user device 100 via network 103 to social media server 106 (step 408). Social media server 106 may then send the message through the network 103 to a receiving user on user device 2 101.

Figure 5:
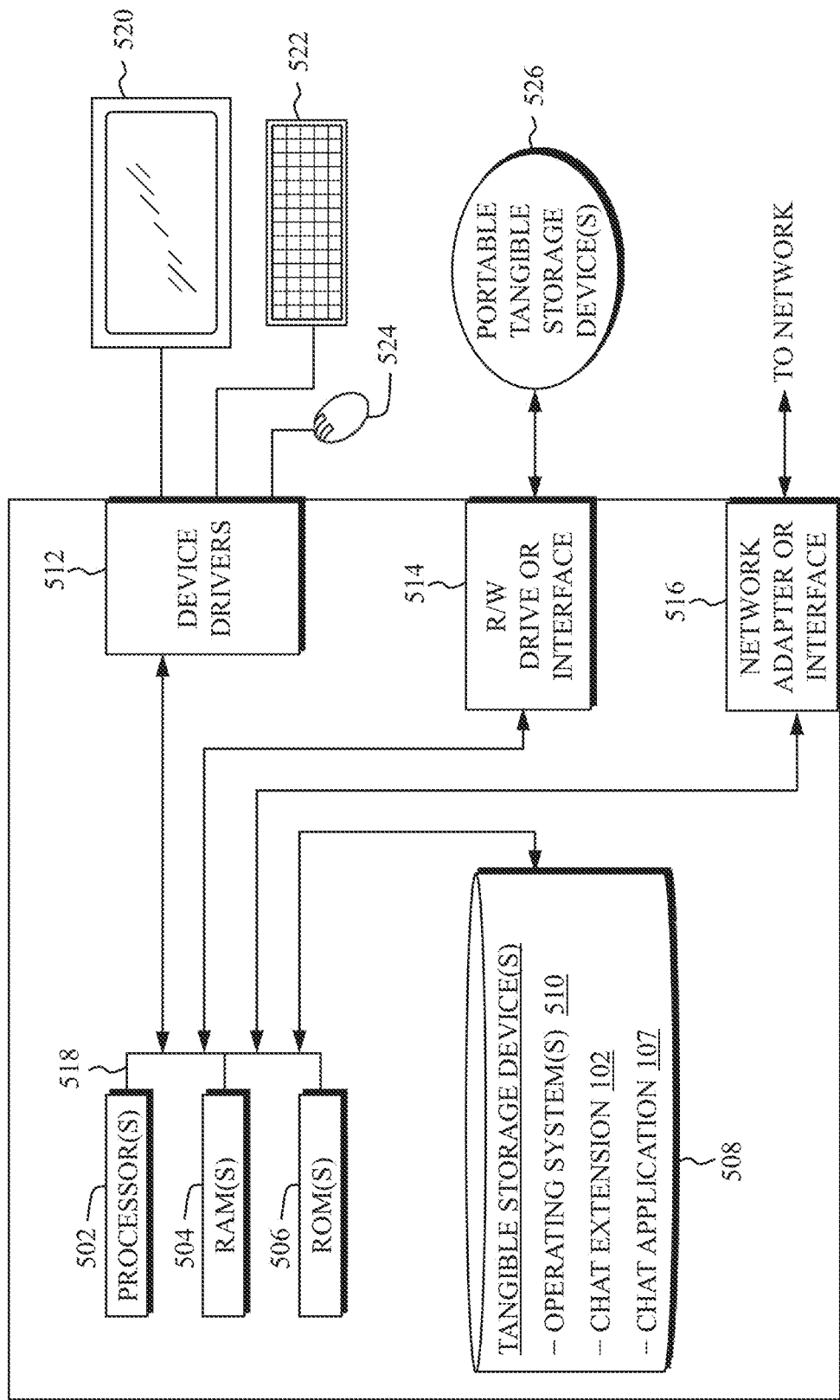
FIG. 5 is a block diagram of internal and external components within the computing devices of FIG. 1, in accordance with an embodiment of the present invention.

FIG. 5 depicts a block diagram of components of user device 1 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

One or more operating systems 510, chat extension 102, chat application 107 are stored on one or more of the computer-readable tangible storage devices 508 for execution by one or more of the processors 502 via one or more of the respective RAMs 504 (which typically include cache memory). In the illustrated embodiment, each of the computer-readable tangible storage devices 508 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User device 1 100 and user device 2 101 can also include a R/W drive or interface 514 to read from and write to one or more portable computer-readable tangible storage devices 526. Chat extension 102 of user device 1 100 can be stored on one or more of the portable computer-readable tangible storage devices 526, read via the respective R/W drive or interface 514 and loaded into the respective computer-readable tangible storage device 508.

User device 1 100 and user device 2 101 can also include a network adapter or interface 516, such as a TCP/IP adapter card or wireless communication adapter (such as a 4G wireless communication adapter using OFDMA technology). Chat extension 102 on user device 1 100 can be downloaded to the computing device from an external computer or external storage device via a network (for example, the Internet, a local area network or other, wide area network or wireless network) and network adapter or interface 516. From the network adapter or interface 516, the programs are loaded into the computer-readable tangible storage device 508. The network may comprise copper wires, optical fibers, wireless transmission, routers, firewalls, switches, gateway computers and/or edge servers.

User device 1 100 and user device 2 101 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 can comprise hardware and software (stored in computer-readable tangible storage device 508 and/or ROM 506).

Although an exemplary embodiment of the invention has been described in the context of an instant messaging system, those of skill in the art will recognize that the inventive concepts disclosed may be applied to other electronic communications applications. For example, an embodiment may be implemented in a Facebook environment. In this implementation, relative ranking between a poster and other "friends" may be determined, for example, by the amount of "friends" user is connected with or the amount of "likes" a user receives. The messages monitored may be postings to a friend's wall, comments on a friend's pictures or Facebook Messages. Relative ranking may also be decided based on the users' age, familial relationship or education level attained. In one embodiment, a notification can be sent to a third party, such as a manager. The functionality to determine relative ranking may be assigned, for example, at the Facebook server, and the functionality to monitor a poster's messages may be implemented at the poster's computing device.

Another embodiment may be implemented in a Twitter environment. In this implementation, a relative ranking between a poster and "followers" may be determined, for example, by the amount of reposts of the user's post or comments on the post. The messages monitored may be comments on a followed user's post or pictures. The functionality to determine relative ranking may be implemented, for example, at the Twitter server, and the functionality to monitor a follower's messages may be implemented at the poster's computing device.

Another embodiment may be implemented in e-mail environment. In this implementation, a relative ranking between a sending user and a receiving user may be determined, for example, by organizational hierarchy data. Organizational hierarchy data may contain organizational data files of a business, or institution of members to be ranked. Such data files may hold information which may be used to determine the relative ranking of users within a group. The messages monitored may be email messages sent to a user of a higher ranking. The functionality to monitor a sending user's message may be implemented at the sending user's computing device.

Another embodiment may be implemented in mobile messaging environment like WhatsApp. In this implementation, a relative ranking between a sending user and a receiving user may be determined, for example, by organizational hierarchy data. Organizational hierarchy data may contain organizational data files of a business, or institution of members to be ranked. Such data files may hold information which may be used to determine the relative ranking of users within a group. Relative ranking may also be assigned based on the users' age or familial relationship. In one embodiment, a notification can be sent to a third party, such as a manager. The messages monitored may be chat messages sent to a user of a higher ranking. The functionality to monitor a sending user's message may be implemented at the sending user's computing device. All trademarks used herein are the property of their respective owners.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer program product for electronic communications, the computer program product comprising:
one or more non-transitory computer-readable storage media and program instructions stored on the one or more non-transitory computer-readable storage media, the program instructions comprising:
program instructions to receive, from a sender, a request to communicate with a recipient via a chat application;
program instructions to determine a relative rank of the sender and a relative rank of the recipient based on organization stored on an enterprise server, the relative rank of the sender is determined based on a difference in a number of reporting levels between a rank of the sender and a rank of a manager common to both the sender and the recipient, and the relative rank of the recipient is determined based on a difference in a number of reporting levels between a rank of the recipient and the rank of the manager common to both the sender and the recipient, wherein determining a relative rank of the sender and a relative rank of the recipient is based on a difference in a number of social media network connections of the sender and a number of social media network connections of the recipient, a difference in organizational titles of the recipient and sender; a difference in a level of education attained by the recipient and a level of education attained by the sender; a difference in rankings assigned by an entity to the recipient and the sender, a difference in an age of the recipient and an age of the sender, and a familial relationship between the sender and the recipient, wherein the number of social media network connections of the sender, wherein a number of social media network connections is determined by an amount of "friend" connections in the social media network;

in response to program instructions to determine that the recipient has a higher relative ranking than the sender, program instructions to display to the sender, via the chat application, a first attention message notifying the sender of the higher relative rank of the recipient;

program instructions to receive a first message entered by the sender into the chat application;

in response to program instructions to determine that the first message comprises a predefined word or phrase, program instructions to display a second attention message to the sender, via the chat application, notifying the sender of a possible violation of a company policy and allowing the sender to revise the first message;

in response to program instructions to determine the first message comprises an action item, program instructions to send a fourth attention message to a third party specifying that the first message comprises an action item, wherein the third party is a manager of the sender;

in response to program instructions to determine the first message comprises a numerical value, program instructions to send a fifth attention message to the third party specifying that the first message comprises a numerical value; and in response to program instructions to receive an indication from the sender to send the first message, program instructions to send the first message from the sender to the recipient.

2. The computer program product according to claim 1, further comprising:
in response to program instructions to determine that the first message comprises a spelling mistake, program instructions to display a third attention message to the sender, via the chat application, notifying the sender of the spelling mistake and underlining the spelling mistake in the body of the first message.

3. The computer program product according to claim 1, further comprising program instructions to receive revisions to the first message by the sender.

4. The computer program product according to claim 1, wherein program instructions to display the second attention message to the sender comprises program instructions to underline the predefined word or phrase in the body of the first message.

5. The computer program product according to claim 1, wherein the sender is a member of the organization hierarchy data and the predefined word or phrases are predefined by an organization.

6. The computer program product according to claim 1, further comprising:
in response to program instructions to determine that the first message comprises a numerical value, program instructions to display a third attention message to the sender, via the chat application, notifying the sender of the numerical value and underlining the numerical value in the body of the first message.

7. A computer program product for electronic communications, the computer program product comprising:
one or more non-transitory computer-readable storage media and program instructions stored on the one or more non-transitory computer-readable storage media, the program instructions comprising:
program instructions to receive, from a sender, a request to communicate with a recipient via a chat application;

program instructions to determine a relative rank of the sender and a relative rank of the recipient based on organization hierarchy data stored on an enterprise server, the relative rank of the sender is determined based on a difference in a number of reporting levels between a rank of the sender and a rank of a manager common to both the sender and the recipient, and the relative rank of the recipient is determined based on a difference in a number of reporting levels between a rank of the recipient and the rank of the manager common to both the sender and the recipient, wherein determining a relative rank of the sender and a relative rank of the recipient is based on a difference between a number of social media network connections of the sender and a number of social media network connections of the recipient, a difference in organizational titles of the recipient and sender; a difference in a level of education attained by the recipient and a level of education attained by the sender; a difference in rankings assigned by an entity to the recipient and the sender, a difference in an age of the recipient and an age of the sender, and a familial relationship between the sender and the recipient, wherein a number of social media network connections is determined by an amount of "friend" connections in the social media network;

in response to program instructions to determine that the recipient has a higher relative ranking than the sender, program instructions to display to the sender, via the chat application, a first attention message notifying the sender of the higher relative rank of the recipient;

program instructions to receive a first message entered by the sender into the chat application;

in response to program instructions to determine that the first message comprises a predefined word or phrase, displaying a second attention message to the sender, via the chat application, program instructions to notify the sender of a possible violation of a company policy and allowing the sender to revise the first message;

in response to program instructions to determine that the first message comprises a spelling mistake, program instructions to display a third attention message to the sender, via the chat application, notifying the sender of the spelling mistake and underlining the spelling mistake in the body of the first message;

in response to program instructions to determine that the first message comprises a numerical value, program instructions to display a fourth attention message to the sender, via the chat application, notifying the sender of the numerical value and underlining the numerical value in the body of the first message;

in response to determining the first message comprises an action item, program instructions to send a fifth attention message to a third party specifying that the first message comprises an action item, wherein the third party is a manager of the sender;

in response to determining the first message comprises a numerical value, program instructions to send a sixth attention message to the third party specifying that the first message comprises a numerical value; and in response to receiving an indication from the sender to send the first message, program instructions to send the first message from the sender to the recipient.

8. The computer program product according to claim 7, further comprising:
program instructions to receive revisions to the first message by the sender.

9. The computer program product according to claim 7, wherein program instructions to display the second attention message to the sender comprises underlining the predefined word or phrase in the body of the first message.

10. The computer program product according to claim 7, wherein the sender is a member of the organization hierarchy data and the predefined word or phrases are predefined by an organization.

* * * * *